United States Patent
Ghisu et al.

(10) Patent No.: US 10,730,073 B2
(45) Date of Patent: Aug. 4, 2020

(54) ELECTRONIC CIRCUIT, CORRESPONDING ULTRASOUND APPARATUS AND METHOD

(71) Applicant: STMicroelectronics S.r.l., Agrate Brianza (IT)

(72) Inventors: Davide Ugo Ghisu, Milan (IT); Sandro Rossi, Pavia (IT); Andrea Gambero, Buscate (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 301 days.

(21) Appl. No.: 15/691,292

(22) Filed: Aug. 30, 2017

(65) Prior Publication Data
US 2018/0243791 A1    Aug. 30, 2018

(30) Foreign Application Priority Data

Feb. 24, 2017  (IT) ................. 102017000021353
Feb. 24, 2017  (IT) ................. 102017000021374

(51) Int. Cl.
*H04B 1/02*    (2006.01)
*B06B 1/02*    (2006.01)
(Continued)

(52) U.S. Cl.
CPC ............ *B06B 1/0215* (2013.01); *G01S 7/524* (2013.01); *G01S 7/52079* (2013.01); *G01S 15/89* (2013.01); *B06B 1/06* (2013.01); *B06B 2201/76* (2013.01)

(58) Field of Classification Search
None
See application file for complete search history.

(56) References Cited

U.S. PATENT DOCUMENTS 3,555,888 A    1/1971  Brown
4,222,113 A *  9/1980  Hansen ............... G01S 7/52003
                                                        307/99
(Continued)

FOREIGN PATENT DOCUMENTS

CN    1851487 A    10/2006
CN    102668380 A    9/2012
(Continued)

OTHER PUBLICATIONS

Elmos Semiconductor AG. Signal conditioning IC for directly driven ultrasonic sensors E524.07. Production Data—Jul 23, 2015. (Year: 2015).*

(Continued)

*Primary Examiner* — Isam A Alsomiri
*Assistant Examiner* — Jonathan D Armstrong
(74) *Attorney, Agent, or Firm* — Seed IP Law Group LLP

(57) ABSTRACT

A circuit for an ultrasonic channel has a first and a second terminal between which extend a resistive and diode signal paths including a pair of diodes with opposing polarities, for example in anti-parallel. Switching circuitry is coupled with the resistive and diode signal paths and is switchable between first and second states. In the first state, the first and the second terminals are coupled with one another via the resistive signal path. In the second state, the first and the second terminals are coupled with one another via the diode signal path. The switching circuitry includes first and second transistor discharge circuits coupled between first and second drive lines and current paths of these transistors, and coupled to control terminals of these transistors. The control terminals are coupled to the first or second drive line and are non-conductive and conductive in first and second operating states, respectively.

26 Claims, 7 Drawing Sheets

(51) Int. Cl.
*G01S 15/89* (2006.01)
*G01S 7/524* (2006.01)
*G01S 7/52* (2006.01)
*B06B 1/06* (2006.01)

(56) References Cited

U.S. PATENT DOCUMENTS

| | | | |
|---|---|---|---|
| 4,255,782 A * | 3/1981 | Joyce | H02M 5/293 363/159 |
| 4,321,485 A * | 3/1982 | Morozowich | H03K 17/04126 327/478 |
| 4,353,004 A * | 10/1982 | Kleinschmidt | G01S 7/524 310/317 |
| 4,357,690 A * | 11/1982 | Kuroda | A61B 10/00 310/317 |
| 4,453,073 A * | 6/1984 | Bredenkamp | H02M 7/53835 219/130.1 |
| 5,321,597 A | 6/1994 | Alacoque | |
| 6,050,945 A * | 4/2000 | Peterson | B06B 1/0215 600/443 |
| 6,074,346 A * | 6/2000 | Oppelt | B06B 1/0215 600/437 |
| 6,083,164 A * | 7/2000 | Oppelt | B06B 1/0215 600/437 |
| 6,316,993 B1 | 11/2001 | Hellums | |
| 6,342,805 B1 * | 1/2002 | Chen | H03K 17/945 327/278 |
| 7,402,984 B1 | 7/2008 | Huang | |
| 7,977,820 B2 | 7/2011 | Chu et al. | |
| 8,447,046 B2 | 5/2013 | Huang et al. | |
| 8,760,169 B2 | 6/2014 | Tang | |
| 9,455,693 B2 | 9/2016 | Ghisu et al. | |
| 9,544,965 B1 | 1/2017 | O'Neil et al. | |
| 9,568,597 B2 | 2/2017 | Choy et al. | |
| 9,979,363 B2 | 5/2018 | Ko et al. | |
| 2005/0146371 A1 | 7/2005 | Wodnicki | |
| 2005/0171431 A1 | 8/2005 | Petersen | |
| 2005/0256409 A1 * | 11/2005 | Pomata | G01S 7/52025 600/459 |
| 2005/0275310 A1 * | 12/2005 | Ripoll | F02D 41/2096 310/317 |
| 2006/0184033 A1 * | 8/2006 | Cerofolini | A61B 8/00 600/459 |
| 2007/0046143 A1 * | 3/2007 | Blandino | B06B 1/0238 310/317 |
| 2008/0150858 A1 | 6/2008 | Nishi et al. | |
| 2010/0039159 A1 | 2/2010 | Otaka et al. | |
| 2010/0113934 A1 | 5/2010 | Oguzman et al. | |
| 2010/0128898 A1 | 5/2010 | Wong | |
| 2012/0250462 A1 * | 10/2012 | Franchini | G01S 15/8906 367/87 |
| 2012/0313689 A1 | 12/2012 | Bottarel et al. | |
| 2013/0170321 A1 * | 7/2013 | Haider | A61B 8/4483 367/140 |
| 2014/0085761 A1 | 3/2014 | Croft | |
| 2014/0312954 A1 * | 10/2014 | Ghisu | H03K 3/356113 327/333 |
| 2015/0117675 A1 * | 4/2015 | Jennings | H04R 3/00 381/94.1 |
| 2015/0181352 A1 * | 6/2015 | Astgimath | H04R 3/00 381/174 |
| 2015/0281836 A1 * | 10/2015 | Nguyen | H04R 3/00 381/120 |
| 2015/0318829 A1 * | 11/2015 | Astgimath | H03F 3/505 381/120 |
| 2018/0156903 A1 * | 6/2018 | Pattipaka | G01S 7/52077 |
| 2018/0226964 A1 * | 8/2018 | Terenzi | H03K 17/6874 |
| 2018/0248544 A1 * | 8/2018 | Ghisu | H03K 17/567 |
| 2018/0271493 A1 * | 9/2018 | Jensen | A61B 8/4494 |
| 2019/0209139 A1 * | 7/2019 | Petersen | A61B 8/0883 |

FOREIGN PATENT DOCUMENTS

| | | |
|---|---|---|
| CN | 102802535 A | 11/2012 |
| CN | 103229418 A | 7/2013 |
| CN | 103716017 A | 4/2014 |
| CN | 106140592 A | 11/2016 |
| WO | 2011/079881 A1 | 7/2011 |

OTHER PUBLICATIONS

Bianchi et al., "Analysis and Design of a High Voltage Integrated Class-B Amplifier for Ultra-Sound Transducers," *IEEE Transactions on Circuits and Systems—I: Regular Papers* 61(7): 1942-1951, Jul. 2014.

Tripath Technology, Inc., "TAA4100—Four Channel Class-T Digital Audio Amplifier using Digital Power Processing (DPP™) Technology," MAX14807, Preliminary Information, Revision 0.97, Apr. 2005, 20 pages.

* cited by examiner

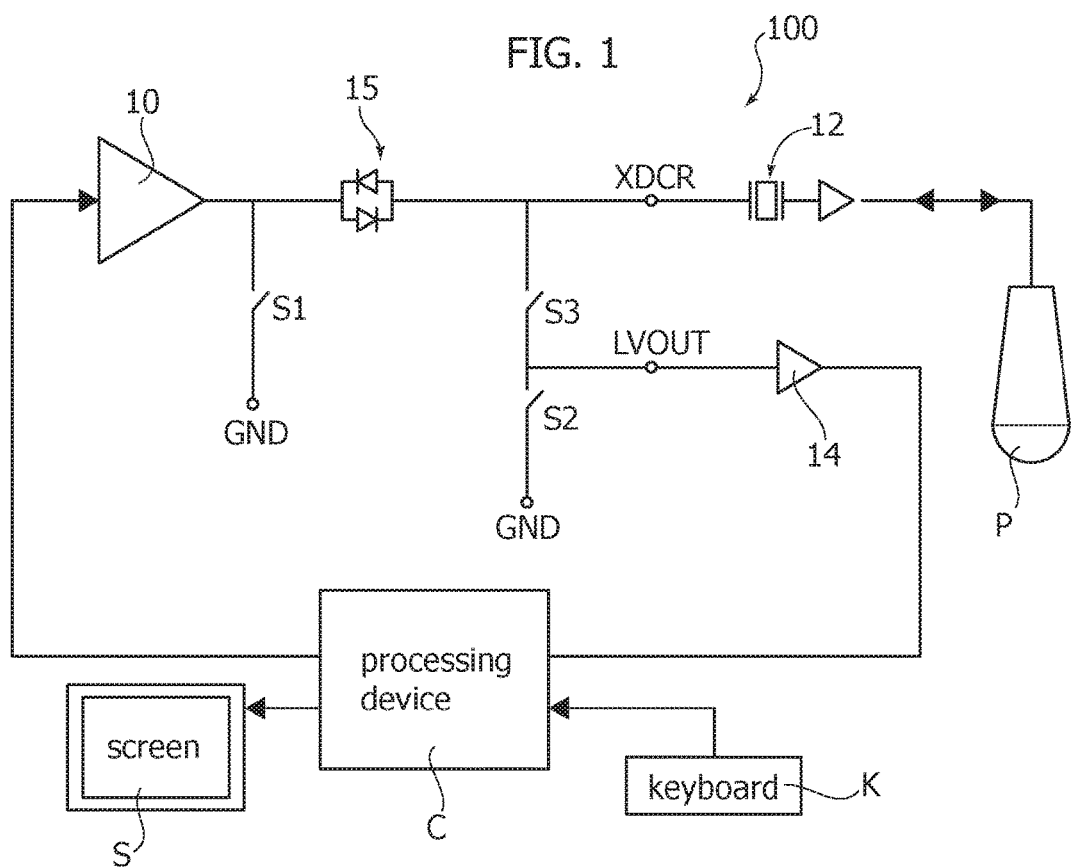
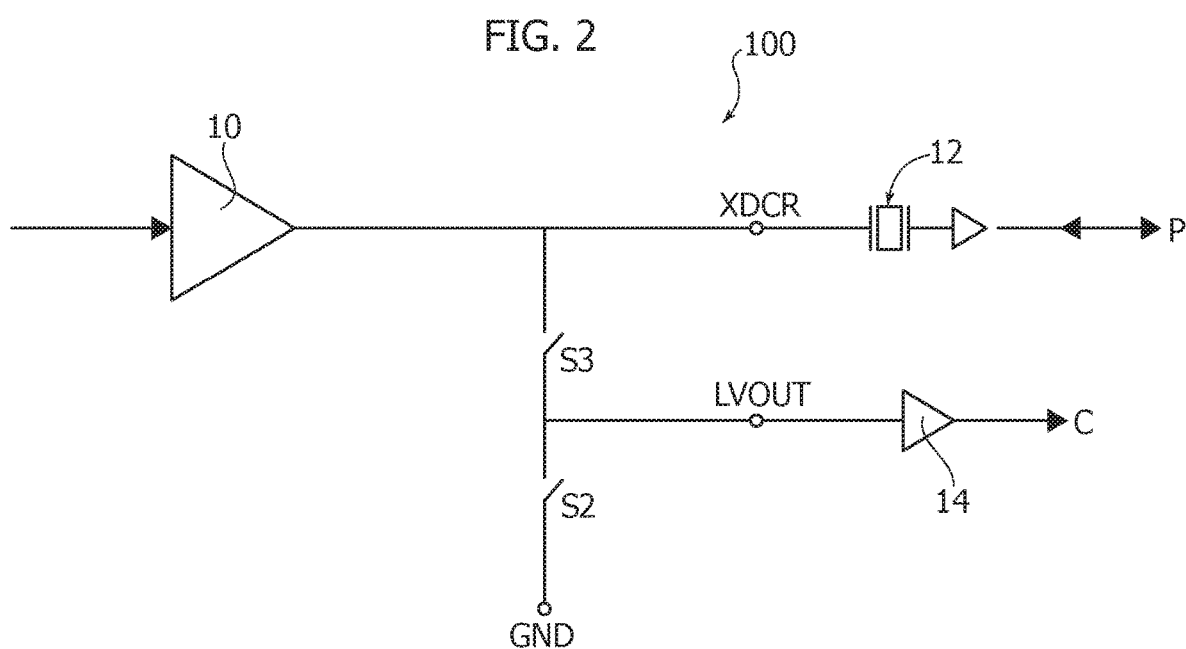

ELECTRONIC CIRCUIT, CORRESPONDING ULTRASOUND APPARATUS AND METHOD

BACKGROUND

Technical Field

The description relates generally to electronic drive circuits, and more specifically to electronic drive circuits usable, for example, in ultrasonic transmission channels in, for example, ultrasound scanning equipment.

Description of the Related Art

Ultrasound scanning systems, such as those used in the medical field, can provide the presence of an ultrasonic transmission channel having the function of electrically stimulating a transducer (for example an ultrasound generator made of piezoelectric material or of the capacitive type) connected to its output during a transmit phase. Conversely, during a receive phase, the channel receives the echo of the transmitted wave from the transducer transferring it to the receiver circuitry and processing of the signal.

Over the years, a rather extensive research and innovation activity has been dedicated to this technological sector, as attested by documents such as, for example, U.S. Pat. No. 9,455,693 B2.

BRIEF SUMMARY

In view of this extensive activity, the need to dispose of improved solutions is still noted, for example as regards the reduction of phenomena, such as phenomena of charge injection onto nodes connected along the receiver path, able, in the case of the application to ultrasound scanning equipment, to generate artefacts in the phase for processing the received images.

The claims form an integral part of the technical teachings put forward here in relation to one or more embodiments.

One or more embodiments may offer one or more of the following advantages:

extensive reduction, and virtual elimination, of negative effects likely to manifest themselves at switch-on/switch-off of the various blocks included in an ultrasonic channel, these phenomena being likely to be particularly critical when linear drivers are used, possibility of avoiding voltage drop phenomena, attenuation or distortion of the signal both during the transmit phase and during the receive phase, implementation with low-voltage components and with reduced consumption (for example in DC mode), possibility, in the case of linear drivers, of modulating the glitch associated with the offset in output of the corresponding operational amplifier shifting its frequency harmonic content outside of the range used for the detection.

One or more embodiments may offer one or more of the following advantages:

extensive reduction and virtual elimination of negative effects liable to occur when powering up and down the different blocks included on an ultrasound channel, such phenomena being in particular potentially critical when using linear drivers, option of avoiding voltage drop phenomena, attenuation or distortion of the signal both during the transmit phase and during the receive phase, construction using low-voltage components with low consumption (for example continuous), option, in the case of linear drivers, of modulating the glitch linked to the output offset of the corresponding operational amplifier, moving the harmonic content of same to frequencies outside the field that is used for detection.

BRIEF DESCRIPTION OF THE VARIOUS VIEWS OF THE DRAWINGS

One or more embodiments will now be described, purely by way of non-limiting example, with reference to the appended figures, in which:

FIG. 1 exemplifies possible general use of an ultrasound transmission system;

FIG. 2 illustrates possible variants able to be introduced into a circuit such as that in FIG. 1;

Figure 4:
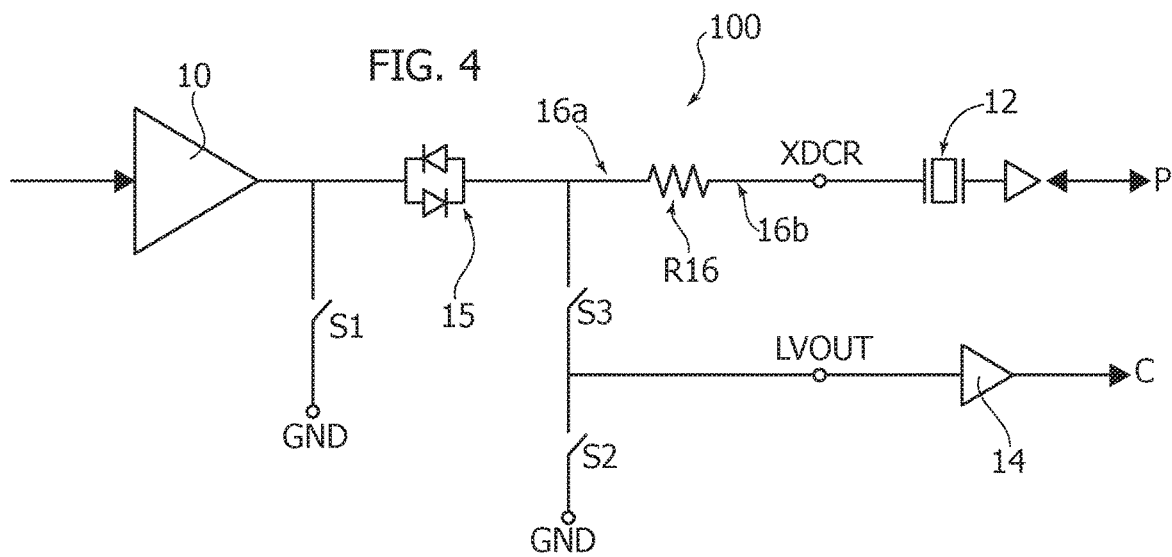
Figure 5:
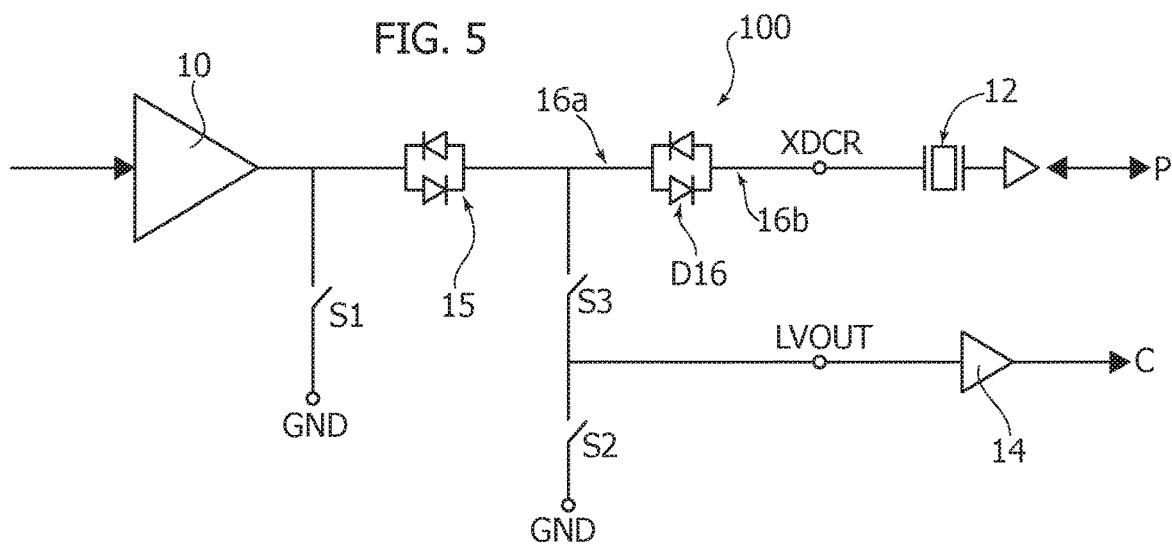
Figure 6:
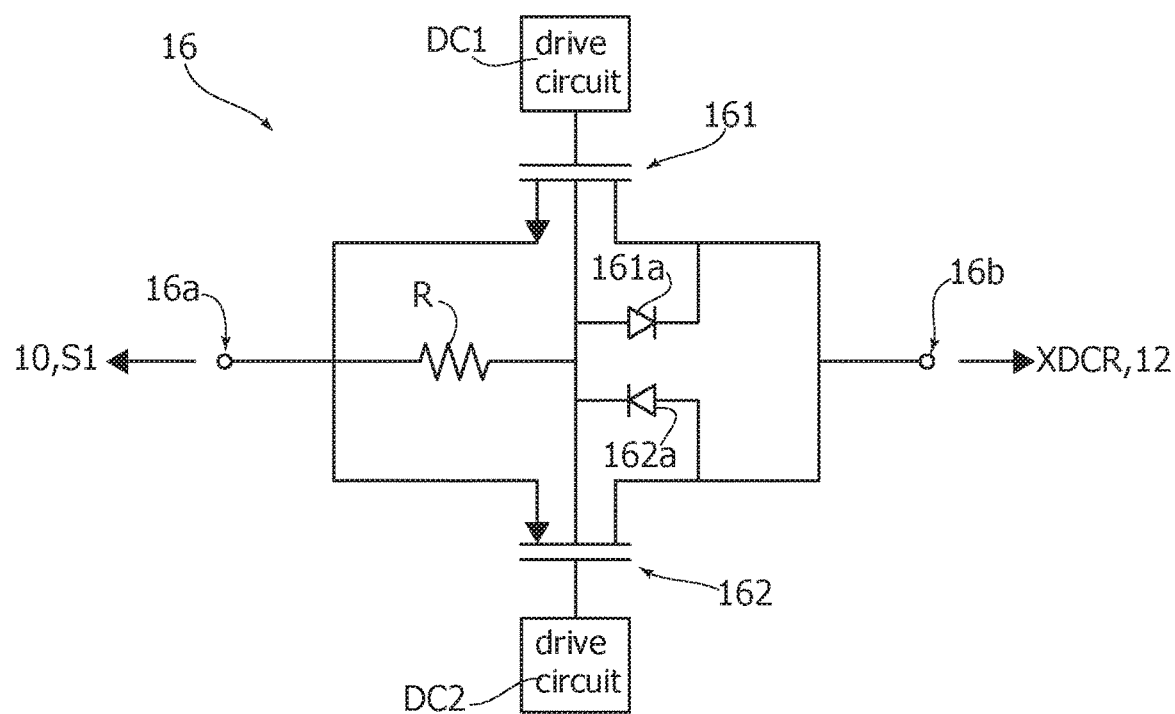
Figure 7:
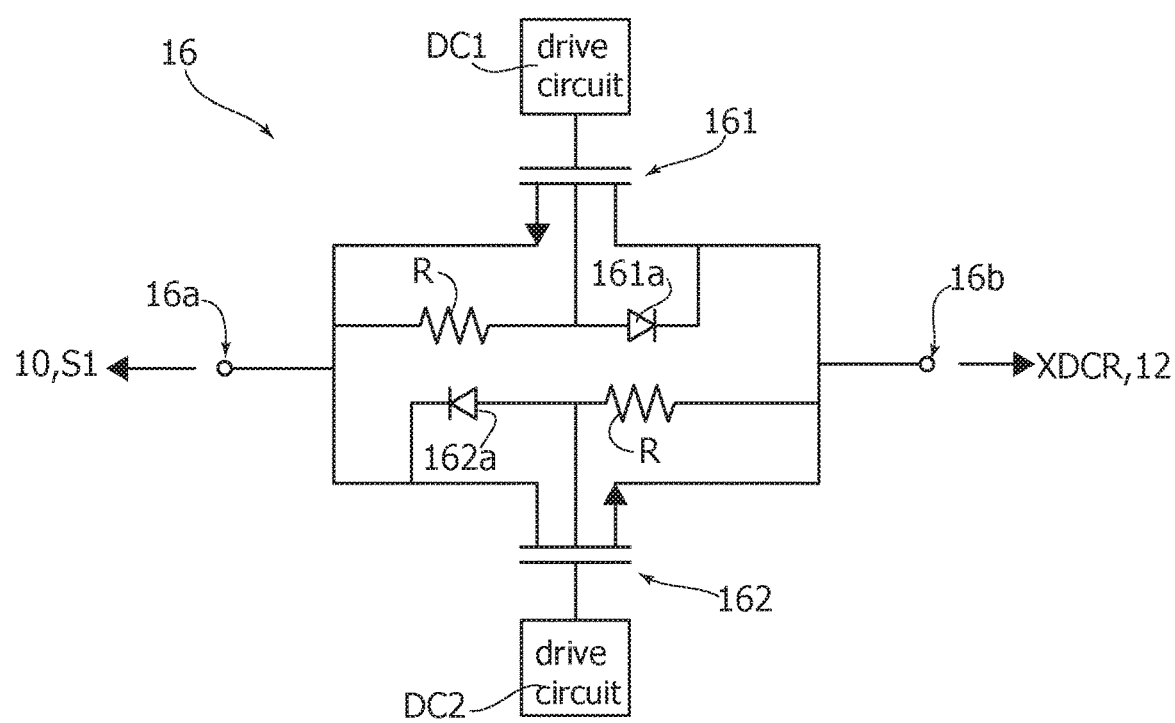
Figure 8:
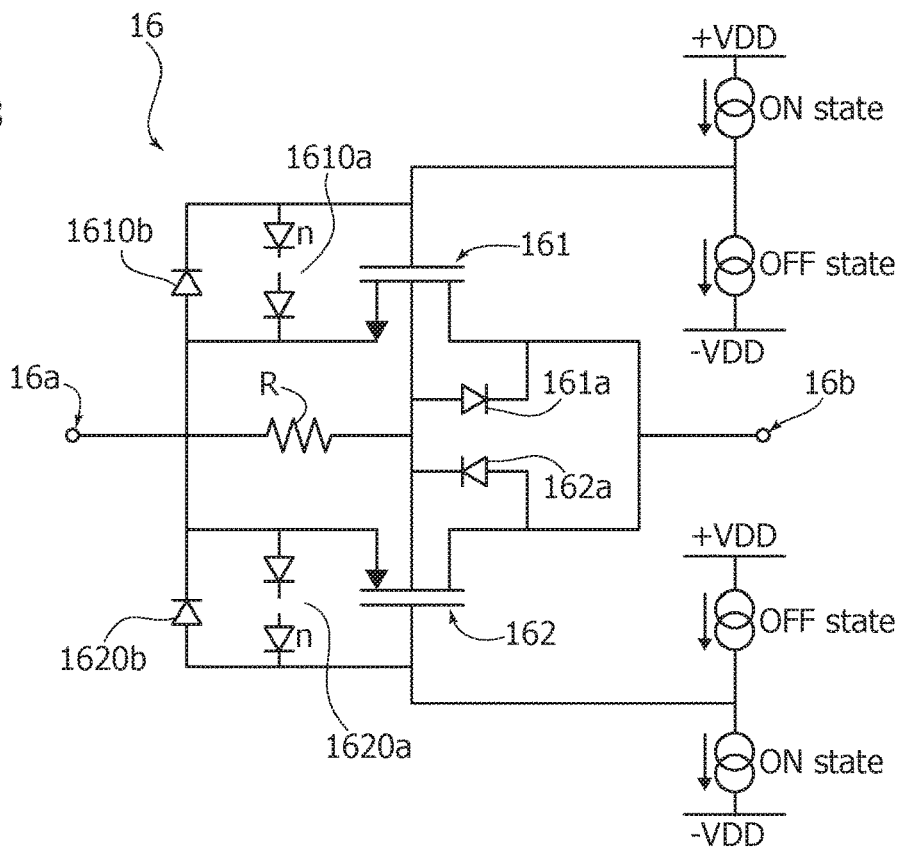
Figure 9:
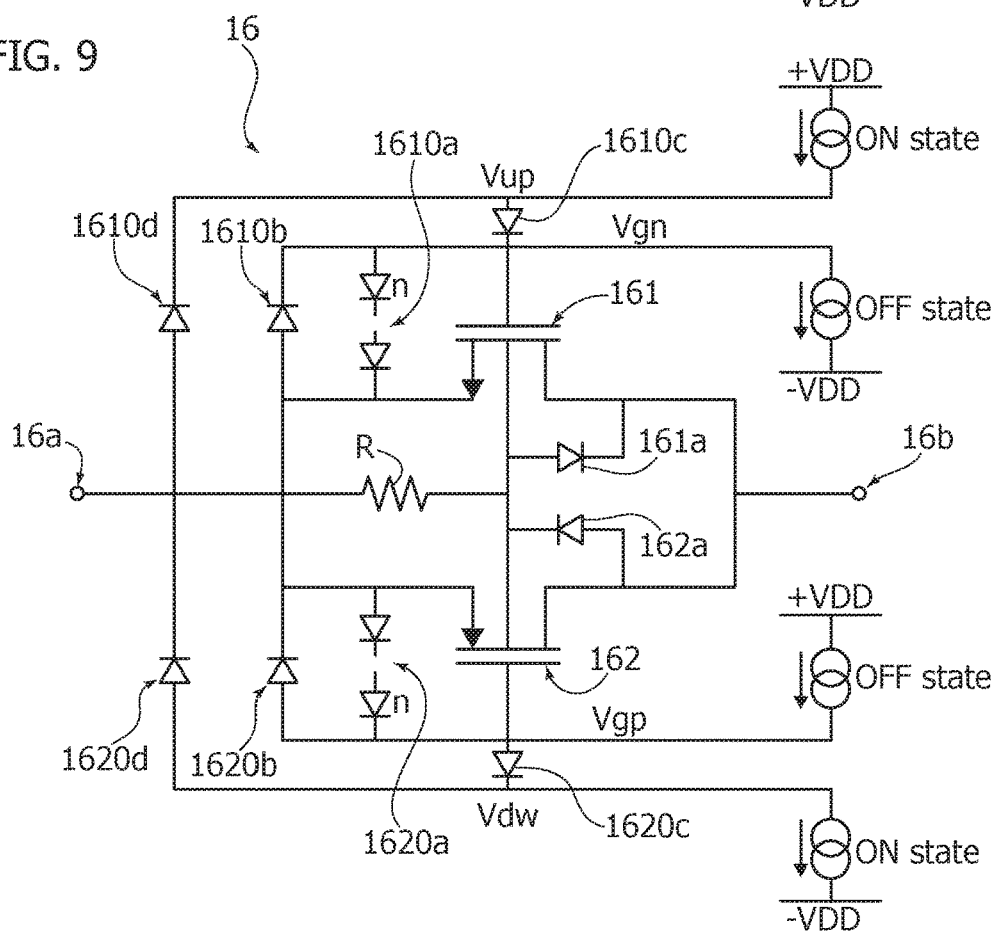
Figure 10:
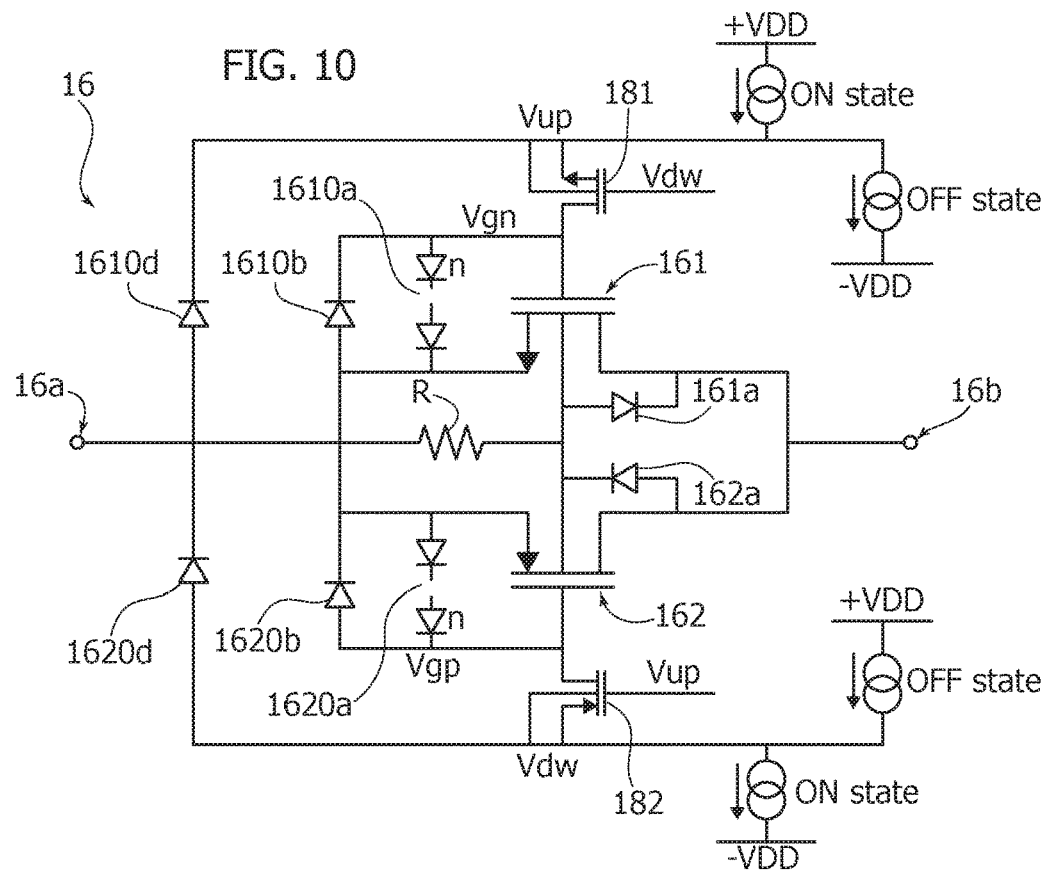
Figure 11:
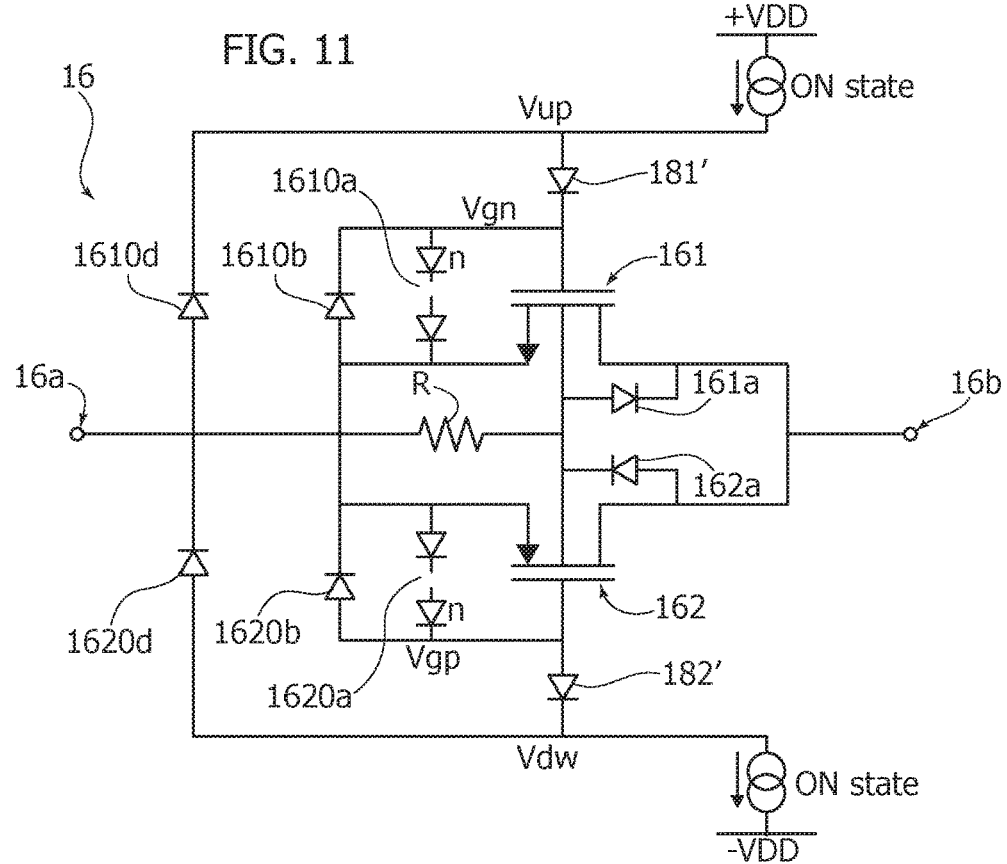
Figure 12:
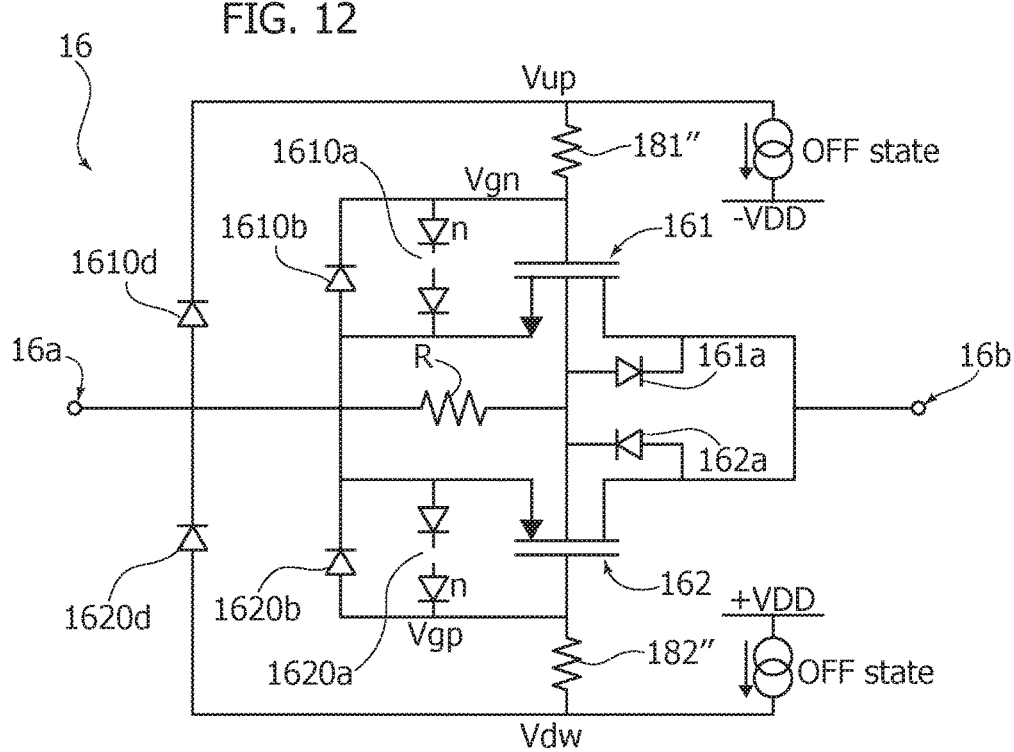
Figure 13:
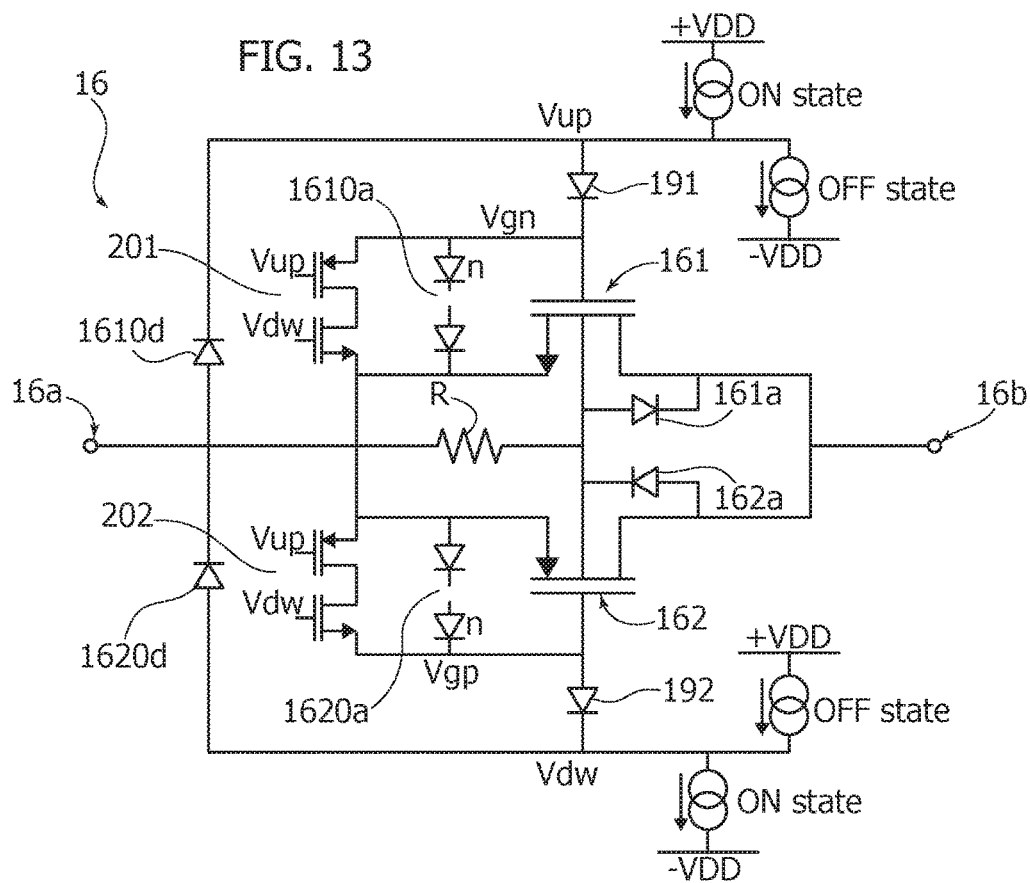
Figure 14:
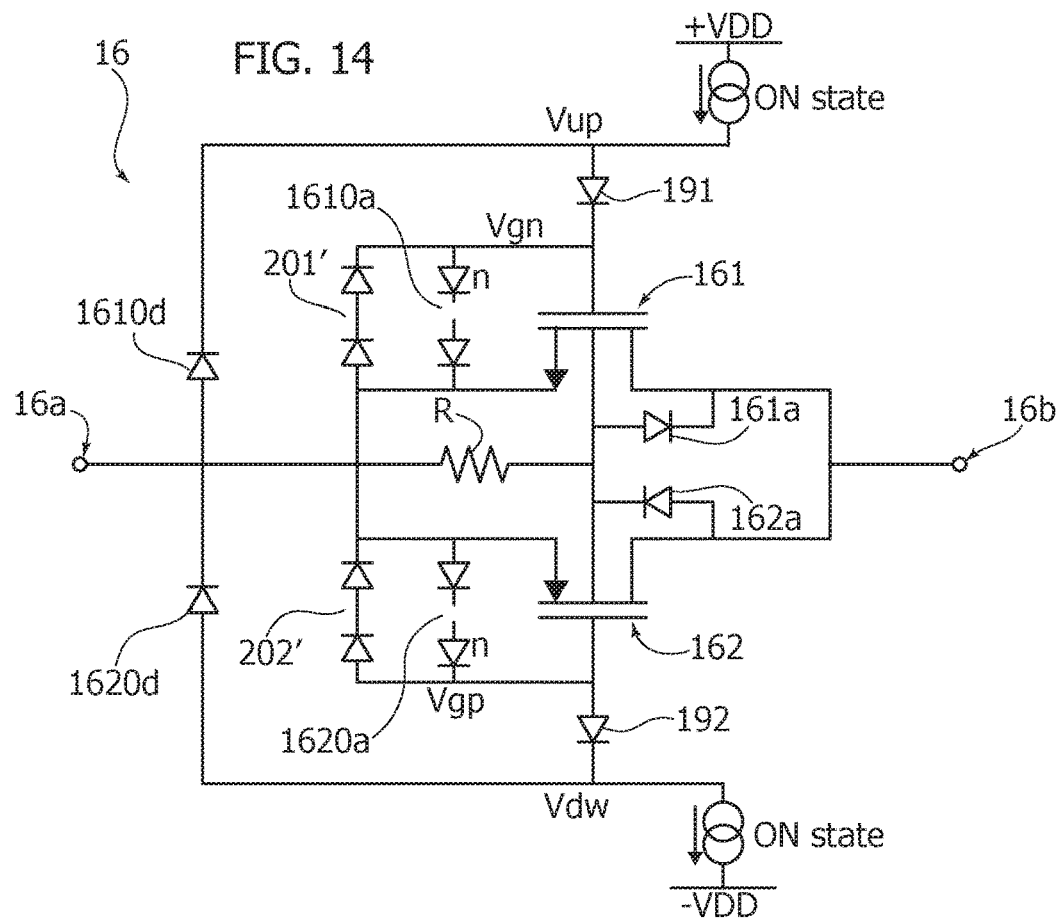
Figure 15:
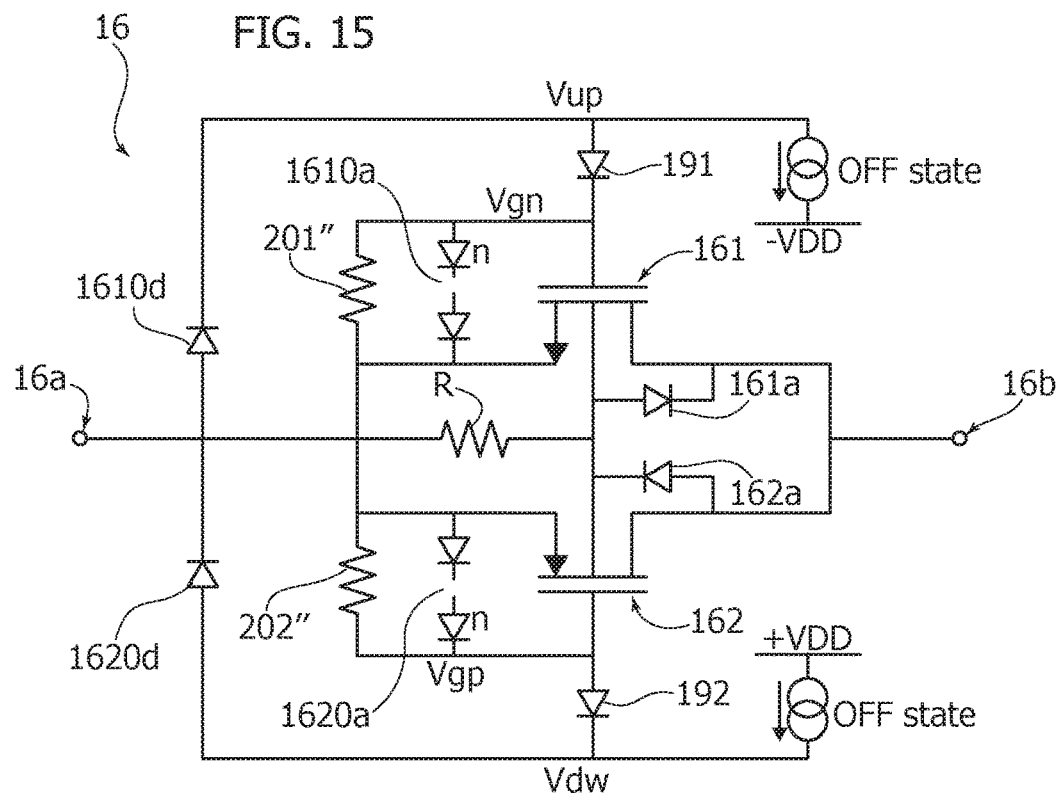

FIGS. 4 and 5 exemplify various conditions of operation of one or more embodiments of the present disclosure; and FIGS. 6 and 7 are more detailed circuit diagrams of possible exemplary embodiments of the present disclosure;

FIGS. 8 and 9 are more detailed example circuit diagrams of possible embodiments of the drive circuits of FIGS. 6 and 7 according to embodiments of the present disclosure;

FIGS. 10-12 are example circuit diagrams of further embodiments of the drive circuits of FIGS. 6 and 7 and of the possible operation of same; and FIGS. 13-15 are further example circuit diagrams of embodiments of drive circuits of FIGS. 6 and 7 and of the possible operation of same.

DETAILED DESCRIPTION

In the description that follows various details are illustrated specific to the aim of providing a complete understanding of various examples of embodiments according to the description. The embodiments may be obtained without one or more of the specific details, or with other methods, components, materials, etc. In other cases, known structures, materials or operations are not illustrated or described in detail so that the various aspects of the embodiments will not be rendered unclear. A reference to "an embodiment" in the framework of the present description is intended to indicate that a particular configuration, structure or feature described in relation to the embodiment is included in at least one embodiment. Accordingly, the phrases such as "in one embodiment" that may appear at various points in the present description do not necessarily make reference to exactly the same embodiment. Furthermore, particular configurations, structures or features may be combined in any given appropriate manner in one or more embodiments.

The references which used are provided solely for convenience and thus do not define the scope of protection or the scope of the embodiments.

FIG. 1 shows, in general terms, a possible context of use of an ultrasonic channel indicated overall with 100.

This context is illustrated in an overall manner in FIG. 1 it being understood that all the solutions exemplified in FIGS. 2 to 5—presented in a distinct manner for better clarity and generality—are (also) able to be applied in this context.

By way of example, such an ultrasonic channel may be included in an apparatus such as an ultrasound scanning system usable for example in the medical field. The reference to this possible application will not however be understood in the limiting sense of the embodiments, which are able to be used, for example, also in ultrasound equipment of different types such as for example equipment for the analysis/inspection of materials.

Such an apparatus may comprise, for example, a probe P designed to apply an ultrasonic signal to the body of a patient undergoing an ultrasonic examination and to receive a corresponding echo signal.

The operation of the apparatus may be coordinated by a processing unit or device C (such as for example a controllable CPU for example by means of an interface such as a keyboard K).

The device C may, for example, control the operation of a transmission driver 10 determining the emission of an ultrasonic signal through the probe P and the reception, still via the ultrasonic channel 100, of an echo signal able to be processed, for example, in the same unit C, with a view to the potential display on a screen S or graphics unit.

Subject to what is said in more detail in the following, the general criteria of operation of an apparatus as previously considered are to be taken as known per se to those skilled in the art, which renders the presentation of a more detailed description at this point superfluous. In this regard, it will once again be noted that the general application context exemplified in FIG. 1 is, generally speaking, referable to all the possible implementations of the channel 100 exemplified with reference to the other figures.

For what is of interest here, it will suffice to point out that the channel 100 has the function of electrically stimulating an active element 12 connected to a terminal XDCR (this active element is able to form part of the probe P previously discussed).

The element 12 may comprise a piezoelectric or capacitive transducer (for example a CMUT—acronym for Capacitive Micromachined Ultrasonic Transducer, also known as a PMUT).

During the transmit phase, the channel 100 may accordingly apply to the transducer 12 an ultrasonic stimulation signal coming from the driver 10—which signal may be a (high)-voltage signal, for example a sine wave at 200 volt peak-to-peak—whereas during the receive phase the channel 100 receives, via the transducer 12 coupled to the terminal XDCR, the echo of the transmitted wave carrying it to a terminal (at low voltage) LVOUT which is connected to a receive chain 14.

The chain in question (here exemplified in the form of a single amplifier) may comprise various stages in cascade (low-noise input stage, stages for amplification/conditioning of the signal, analogue/digital converter filter) which transfer the received signal to the processing unit C.

In one or more embodiments, a clamp circuit may be present that is able to apply a reference voltage, for example ground GND, to the output of the driver 10 at the end of the transmit phase and fix the DC during the receive phase.

In one or more embodiments, the clamp circuit in question, here exemplified in the form of a switch S1, such as for example an electronic switch such as a MOSFET, may be integrated into the driver 10, able to be implemented according to the criteria illustrated in U.S. patent application Ser. No. 15/690,963, filed on Aug. 30, 2017, incorporated herein by reference.

Then, a further switch circuit (called TRSW) may be provided which may comprise—by way of example—two switches S2, S3 (also, in this case, the switches may be electronic switches such as for example MOSFETs) able to operate (for example under the control of the unit C) in such a manner that:

during the transmit phase, the switch indicated with S3 (interposed between the terminals XDCR and LVOUT) is open (non-conducting) so as to protect the reception channel connected to the terminal LVOUT from the signal (at high voltage) generated by the driver 10 and applied to the terminal XDCR, and during the receive phase, the switch S3 is closed (i.e., conducting, ideally with zero resistance) and connected to the terminal XDCR (on which the echo signal is received, at high voltage) with the reception channel connected to the terminal LVOUT.

Thus, as schematically shown in the figures, it is also possible to provide a second switch S2 interposed between the terminal LVOUT and ground which is able (for example still under the control of the unit C) to be closed (i.e., conducting) so as to connect the terminal LVOUT to ground during the transmit phase so as to avoid injections onto the receive chain and to be open (i.e., non-conducting) during the receive phase in which the switch S3 is closed and connects the terminal XDCR to the terminal LVOUT.

It is then possible to provide the presence of two diodes in anti-parallel (i.e., connected in parallel with one another with the anode of one diode connected to the cathode of the other and vice versa) 15 positioned between the output of the driver 10 (including the clamp circuit S1) and the terminal XDCR with the aim of decoupling the high stray capacitance likely to manifest itself in the high-voltage circuits during the receive phase.

The operation of equipment such as ultrasound scanning systems of the type described here provides—in the terms already previously claimed—the alternation of transmit and receive phases also typically exhibiting rather low values of duty cycle (in other words, of ratio between the duration of the transmit phase and the total duration of the transmit-receive cycle), for example less than 1%.

The possible presence of a spurious and unwanted signal on the terminal XDCR may cause an undesirable transmitted wave whose echo could end up superimposed on the useful signal received. It has also been observed that the signal received may have a low voltage value dependent on time. For the echoes "further away," the received signal is in fact of a lower intensity.

In this situation, even a reduced glitch on the terminal XDCR can generate artefacts in the phase for processing the received signals. It is however desirable for these spurious glitches to be able to have a spectral content at a level of (at least) −40/−60 dB with respect to the transmitted signal.

In a circuit diagram such as that exemplified in FIG. 1, the blocking diodes in anti-parallel 15 can allow the potential signal injections from the driver 10 and from the clamp circuit S1 (except when they are less than the threshold voltage of a diode) to be masked, without however being capable of masking the glitches due to the switch-on and switch-off of the other switch circuit (which may comprise, in the cases exemplified here, two switches S3 and S2) comprising high-voltage components (precisely because they are connected to the terminal XDCR).

It is in the end observed that a circuit diagram such as exemplified in the FIG. 1 can introduce a drop in the output signal with the possible appearance of a third order harmonic distortion, for example in the case in which the driver 10 is a linear driver (as may happen in the case of equipment of a more sophisticated type).

This problem may be addressed as is schematically shown in FIG. 2, in other words by eliminating the blocking diodes 15 and requesting the function of clamp to ground directly from the switches S3 and S2, for example associating with the driver 10 circuits capable of decoupling the stray capacitance of the output stage during the receive phase.

Such a solution may lead to an economy in terms of area (associated with the elimination of the diodes in antiparallel) allowing the phenomena of the drop and distortion of the output signal to be reduced and virtually eliminated. The achievement of this result may however be associated with more critical specifications on the glitch, because the output stage of the driver 10 acts directly on the output terminal XDCR, whereby potential spikes due to the switching on/off of the circuit with the switches S3 and S2 may be injected directly onto the transducer.

Figure 3:
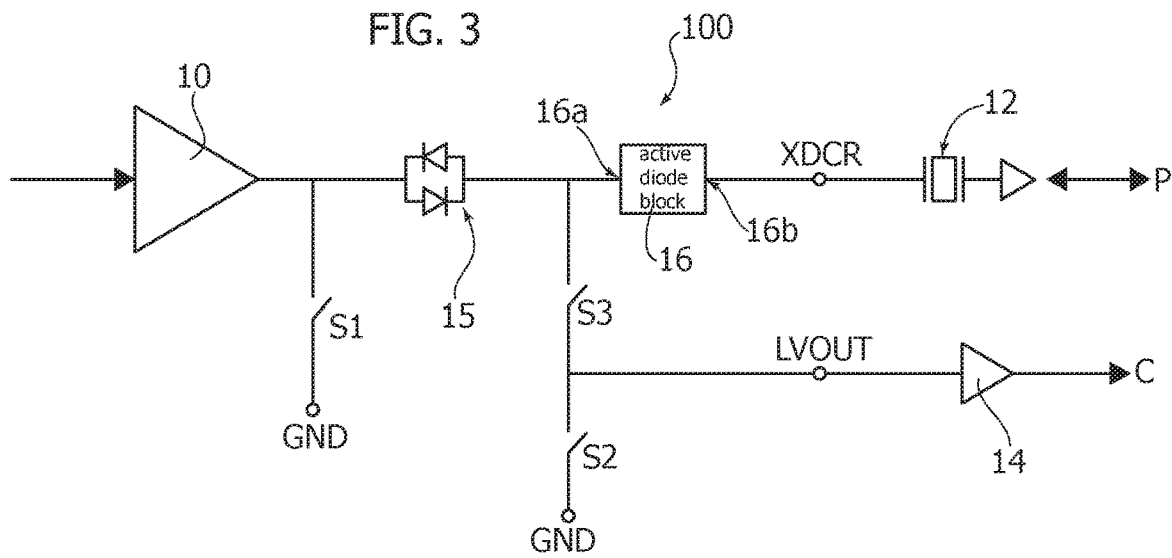
FIG. 3 is schematic illustrating one or more exemplary embodiments of the present disclosure.

One or more embodiments may (for example in the scope of an ultrasonic channel 100 able to be used in a general context as exemplified in the FIG. 1) make use of the circuit diagram exemplified in FIG. 3 where a block 16 is inserted in series with the output terminal XDCR (i.e., with the capacity for the signal sent towards the transducer and the signal received from the transducer 12 to pass through it).

In one or more embodiments, the block 16, in the following denoted for brevity as "active diode block," is able to be selectively switched (for example according to the mode discussed in the following) between:

a first condition or operating state (usable in the transmit and receive phase of the ultrasonic signal), in which—as shown in FIG. 4—the block 16 behaves essentially as a resistance R16 of reduced value (for example hundreds of milliohms) with a stray capacitance correspondingly reduced (for example a few pF), and a second condition or operating state (usable in the passage between the transmit phases and the receive phases of the ultrasonic signal, which are alternated over time), in which—as shown in the FIG. 5—the block 16 behaves as a pair of diodes D16 coupled with opposing polarities (for example in anti-parallel as shown schematically in FIG. 5 or, potentially, also in series with one another—in other words with the cathodes or the anodes mutually coupled).

One or more embodiments allow the phenomena of injection of spurious signals from the other stages of the channel (i.e., from the driver 10, from the switch S1, from the switch S2, S3) to be masked with respect to the terminal XDCR connected to the transducer.

One or more embodiments thus allow the glitch during the passages (in both directions) between the transmit and receive phases to be reduced (and virtually eliminated).

It is verified that one or more embodiments introduce a very limited level of distortion (below −50 dB), so as not to have any negative effects on the quality of the received signal (for example an image level deriving from the processing of the latter).

A block with "active diodes," such as the block 16 exemplified herein, is able, in one or more embodiments, to be implemented in various different ways, for example being used in general as switches that, under the first condition or operating state (FIG. 4), interpose a resistance R16 in the path of propagation of the signal and, under the second condition or operating state (FIG. 5), interpose two diodes D16 in a complementary configuration (for example in anti-parallel) in the signal path.

FIGS. 6 and 7 exemplify possible circuit implementations of the block 16 according to one or more embodiments capable of implementing the operating criteria described above by means of simple drive circuits.

FIG. 6 exemplifies one embodiment in which the employment of two transistors 161, 162 is provided (for example field-effect transistors such as MOSFET transistors) of complementary polarities, for example NMOS and PMOS disposed in a back-to-back connection, in other words with the respective current paths (source-drain, in the case of field-effect transistors) disposed in parallel between the terminals 16a, 16b of the block 16.

As can be seen in FIGS. 3 to 5, the terminals 16a, 16b are able to be connected, respectively, to the driver 10/switch S1 and to the terminal XDCR, hence to the transducer 12.

In one or more embodiments as exemplified in FIG. 6, the aforementioned complementary transistors 161, 162 (for example low voltage) may be connected with common source, drain and body and with the respective drive terminals (gate, in the case of field-effect transistors) coupled to drive or control circuits DC1, DC2, designed to act, for example, under the control of the unit C.

The aforementioned control circuits, indicated with DC1, DC2, may be formed as described in more detail below with reference to FIGS. 8-15.

In one or more embodiments as exemplified in FIG. 6, the body of the two transistors 161, 162 may be biased by means of a resistance R connected to the respective current source terminals (source, in the case of field-effect transistors) and able to be chosen with a value much greater than the value of Ron resistance of the two transistors 161, 162, which may be chosen in such a manner as to have substantially corresponding values of Ron resistances.

In one or more embodiments, in transmit and reception phase (in which, as exemplified in FIG. 4, it is desirable for the block 16 to behave essentially as a resistor R16), the two transistors 161, 162 are "switched on" by the drive circuits DC1, DC2, for example by ensuring that:

VG_nmos>XDCR+VTH and VG_pmos<XDCR−VTH, where

VG_nmos and VG_pmos indicate the voltages applied to the gates of the transistors 161, 162, XDCR represents the voltage on the corresponding terminal, and VTH is the threshold voltage.

Under these conditions, the block 16 can form, between terminals 16a, 16b, a resistive signal path (in CW mode) R16 with a value of resistance given by the parallel combination of the Ron resistances of the two transistors, i.e., Ron_nmos and Ron_pmos.

In AC mode, during the receive phase, the gate-source capacitances of the transistors 161, 162 maintain the two transistors in a conducting state with VGS constant and the block 16 does not introduce effects onto the received signal.

In AC mode, during the transmit phase, the topology exemplified in FIG. 6 allows to always have at least one of the two transistors that tends to turn on. In particular, in the presence of rising signals the PMOS transistor will be able to turn on, whereas during the falling edges, the NMOS transistor will be able to turn on.

The insertion of the resistance indicated with R allows the current path through the well-diodes (indicated with 161a, 162a) to be rendered unfavorable (i.e., high resistance relative to the path formed by the Ron resistances) and to use the body effect of the MOS transistors.

It will be appreciated that, in one or more embodiments (determining the characteristics of the drive circuits DC1, DC2), it is possible to choose to maintain both the transistors 161, 162 conducting or else to use them alternately.

In one or more embodiments, during the transients from transmission to reception and vice versa, the circuits DC1, DC2 may act to turn off the two transistors 161, 162 (for example with VG_nmos<XDCR+VTH and VG_pmos>XDCR−VTH, where the quantities mentioned have the meaning already previously claimed) resulting in the fact that between the two terminals 16a, 16b the two anti-parallel diodes 161a, 162a "become visible" (with a resistance of high value in series such as precisely the resistance R).

In this way, it is possible to mask the glitch phenomena, with the possible exception of those higher than the threshold voltage of the diodes, which will on the other hand be attributable to a malfunction of the system.

In one or more embodiments, the block 16 is designed to be implemented according to the circuit diagram exemplified in FIG. 7, where parts and elements already described in relation to FIG. 6 are indicated with the same references that already appear in FIG. 6: the related description will not therefore be repeated here.

One or more embodiments, as exemplified in the FIG. 7, may provide for the transistors 161, 162 (also here, for example, two MOSFET transistors) to be of the same type (for example two NMOS transistors) with the advantage of being able to use the same type of component.

In one or more embodiments, as exemplified in FIG. 7, with the proviso of the general connection in parallel of the current paths (for example source-drain, in the case of field-effect transistors) between the terminals 16a, 16b (hence with for example common source and drain), it may be provided for both transistors 161 to have their bodies and body connected via a resistance R, respectively to the terminal 16a and to the terminal 16b, in other words, in the case of both transistors, to the terminal 16a, 16b which also acts as the current source terminal (source, in the case of a field-effect transistor) of the transistor itself.

This is with the respective well-diodes 161a, 162a able to be interposed between the body and the current drain terminal (drain, in the case of a field-effect transistor) of the respective transistor 161, 162.

Once again, in one or more embodiments as exemplified in the FIG. 7, in transmit and receive phase (FIG. 4) the two transistors 161, 162 may be turned on (i.e., made to conduct) by the circuits DC1, DC2 with the result that the block 16 behaves in CW mode as a resistive path R16 between the terminals 16a, 16b with a value of resistance given by the parallel combination of the Ron resistances of the two transistors 161 (with the resistances R that once again allow the path of the current through the well-diodes 161a, 162a to be rendered unfavorable).

During the transients from transmission to reception and vice versa (FIG. 5), the two transistors 161, 162 may be turned off and, this being the case, between the two terminals 16a, 16b of the block, the diodes 161a, 162a will once again be seen in anti-parallel with a "high" value of resistance R in series.

In one or more embodiments, with the advantage offered by the solution exemplified in the FIG. 7 of having only one type of component can come the requirement to provide more articulated drive circuits DC1, DC2. This is mainly to take into account the fact that, during the transmit phase, non-symmetrical modulations of the gate-source voltage (VGS) could arise between falling and rising edges of the signal which may be associated with a certain level of second order harmonic distortion.

One or more embodiments may therefore relate to a circuit (for example 16) having a first (16a) and a second (16b) terminal and comprising, between the first (16a) and the second (16b) terminal:

a resistive signal path (see for example R16 in FIG. 4), a diode signal path (see for example D16 in FIG. 5) comprising a pair of diodes with opposing polarities (for example 161a, 162a in the FIGS. 6 and 7), and switch means (see for example the transistors 161, 162) coupled with the said resistive signal path and the said diode signal path, switchable between a first state and a second state, in which:

i) in the first state, the said first and second terminals are coupled to one another via the said resistive signal path (R16—FIG. 4), and ii) in the second state, the said first and second terminals are coupled to one another via the said diode signal path (D16—FIG. 5).

In one or more embodiments, the said diode signal path may comprise a pair of anti-parallel diodes (for example 161a, 162a).

One or more embodiments may comprise a first (for example 161) and a second (for example 162) transistor disposed with their current paths (for example source-drain, in the case of FET) in parallel with one another between the said first and second terminals, in which said resistive signal path comprises the parallel connection of the Ron resistances of the current paths of said transistors.

In one or more embodiments, the said switch means may comprise the said first and second transistor able to be made conductive and non-conductive in the said first state and in the said second state.

In one or more embodiments, the said transistors may comprise field-effect transistors and the said diode signal path comprises the well-diodes of the said field-effect transistors.

In one or more embodiments, the said field-effect transistors may have opposing polarities (N-MOS, P-MOS) with common bodies, optionally with a resistor (for example R) between the sources and the bodies of the said field-effect transistors.

In one or more embodiments, the said field-effect transistors may have the same polarity (for example NMOS) with common sources and drains and separate bodies, optionally with a resistor (for example R) between the sources and the bodies of the said transistors.

One or more embodiments may relate to an ultrasonic apparatus with a transducer terminal (for example XDCR) couplable to an ultrasonic transducer device (for example 12) able to convert an electrical drive signal into an ultrasonic transmit signal and convert an ultrasonic receive signal into an electrical receive signal, in which the ultrasonic apparatus comprises:

a drive device (driver 10, for example linear) activatable for generating said electrical drive signal during a transmit phase, a receive chain (for example 14) for receiving the said electrical receive signal during a receive phase, a switch circuit (for example S1, S2, S3) for coupling the said transducer terminal to the said drive device and to the said receive chain, respectively, during alternating transmit and receive phases, and a circuit according to one or more embodiments, interposed between the said transducer terminal and the said switch circuit with the said switch means switchable (for example DC1, DC2, C) into said first state during said alternating transmit and receive phases and into said second state during the transitions between said alternating transmit and receive phases.

One or more embodiments may comprise a noise-blocking stage (for example 15) comprising diodes with opposing polarities interposed between the said drive device and the said circuit.

In one or more embodiments, the said switch circuit may comprise at least one of:

a first switch (for example S1) coupled to the said drive device and activatable for clamping the output of the drive device to a reference level (e.g., GND) during the said transmit phases, a second switch (for example S3) activatable for coupling said transducer terminal to said receive chain during said receive phases and for decoupling said transducer terminal from said receive chain during said transmit phases, and a third switch (for example S2) activatable for clamping the input of the said receive chain to a reference level during said transmit phases.

A method of operation of an ultrasonic apparatus according to one or more embodiments may comprise:

coupling to said transducer terminal an ultrasonic transducer device able to convert an electrical drive signal into an ultrasonic transmit signal and to convert an ultrasonic receive signal into an electrical receive signal, controlling the said drive device, the said receive chain and the said switch circuit in a sequence of the said alternating transmit and receive phases by switching the said switch means synchronously with the said alternating transmit and receive phases by bringing the said switch means into the said first state during the said transmit and receive phases and into the said second state during the transitions between the said alternating transmit and receive phases.

Accordingly and as shown by way of example in FIG. 8, a first possible solution may involve inserting respective diode chains 1610a, 1620a between the control electrode (gate) and the current path (for example the source) of the transistors 161 and 162, the polarities of said chains being such as to enable conduction towards the current path (for example source) of the transistor 161 (diode chain 1610a) and from the current path (for example source) of the transistor 162 (diode chain 1620a), each chain being associated with at least one diode in antiparallel to the chain (see for example diodes 1610b, 1620b).

This makes it possible to protect the transistors 161, 162 from power-ups and power-downs injecting or cutting (tapping) currents from the gate node towards the low-voltage power supplies (+VDD and −VDD) that are symmetrical to ground.

In all of the foregoing, the terminal 16b can be kept "about" ground during the change of state.

In particular with this solution, during the ON state, i.e., with the control terminals (gates) of the transistors 161 and 162 connected respectively to +VDD and −VDD, VG_nmos=VD×n and VG_pmos=−VD×n may be true, where VG_nmos and VG_pmos indicate the gate voltages of the transistors 161, 162 and VD indicates the threshold voltage of the n nodes in the chains 1610a, 1620a, with both of the transistors 161 and 162 powered up.

Complementarily, during the OFF state, i.e., with the control electrodes (gates) of the transistors 161 and 162 connected respectively to −VDD and +VDD, VG_nmos=−VD, VG_pmos=+VD is true, where VD is the threshold voltage of the diodes 1610b, 1620b and XDCR is connected to GND, with the two transistors 161, 162 powered down.

This topology has the advantage of being extremely simple.

It has been observed that, in an ultrasound channel such as the one shown by way of example in FIGS. 3 to 5, during the transmit phase, i.e., when the driver 10 is sending the ultrasound signal towards the transducer 12 via the block 16, operating situations may occur in which two transistors 161, 162 are powered up and powered down (i.e., made conductive and non-conductive) alternately. This situation may result in an undesirable level of consumption and possible distortions due for example to the different nMOS and pMOS characteristics.

This problem can be addressed, as shown by way of example in FIG. 9, specifically by dividing the supply lines at the voltages +VDD and −VDD into respective lines Vup, Vgn (on the "high" side of the block 16, or towards the transistor 161) and into respective lines Vgp, Vdw (on the "low" side of the block 16, or towards the transistor 162). In all of the foregoing, a first diode 1610c (for example with the anode oriented towards the line Vup) is interposed between the lines Vup, Vgn and a second diode 1620c (for example with the anode oriented towards the line Vgp) is interposed between the lines Vgp, Vdw.

It is also possible to interpose a further two diodes 1610d and 1620d between the input terminal 16a and, respectively, the line Vup and the line Vdw, with the diodes 1610d and 1620 having the anode and the cathode oriented towards the terminal 16a respectively.

This topology makes it possible to conserve the charge Cgs (gate-source capacitance) of the ON state during the high-voltage switching of the output. In particular, the diode 1610c, having inverse polarization, makes it possible to keep the capacitance Cgs_nmos of the transistor 161 charged, even during leading edges.

In such a structure, the power-up drive (+VDD, −VDD) may be connected to the nodes (lines) Vup and Vdw, while the power-down drive (−VDD, +VDD) may be connected to the lines Vgn and Vgp.

Such a topology, shown by way of example in FIG. 9, makes it possible to keep both transistors 161, 162 powered up both during the leading edges and during the falling edges of the output signal.

It has been observed that a solution such as the one shown by way of example in FIG. 9 is more likely to work correctly if the capacitance of the nodes Vgp and Vgn towards the fixed nodes is negligible. It has also been observed that this condition is not easy to achieve, including because the drive circuits for powering-down may induce high-voltage components with sizable parasitic capacitance.

In one or more embodiments, such aspects may be addressed using solutions such as the example solutions shown in FIG. 10 and in FIG. 13 with FIGS. 11 and 12 (on one hand) and FIGS. 14 and 15 (on the other hand), which show examples of operation of the circuit diagrams in FIGS. 10 and 13 respectively in the first state of the block 16 (resistive behavior R16 in FIG. 4) and in the second state of the block ("diode" behavior D16 in FIG. 5).

The components in FIGS. 10 to 15 already introduced and discussed in relation to the preceding figures have been indicated using the same reference signs as before, and accordingly such components are not described again.

One or more of the embodiments shown by way of example in FIG. 10 (and in FIGS. 11 and 12) can be seen as ideally derived from the solution shown in FIG. 9 where the diodes 1610c and 1620c in FIG. 6 are replaced by two electronic switches such as MOS transistors 181, 182 arranged with the current paths (source-drain path) of same interposed respectively:

between the line Vup and the control electrode (gate) of the transistor 161, and between the line Vdw and the control electrode (gate) of the transistor 162.

With reference to the polarity of the components in the circuits shown by way of example in the figures, this may be an nMOS transistor 181 having source and body connected to the line Vup and an nMOS transistor 182 also with source and body connected to the line Vdw.

The drive control electrodes (gates) of the discharge transistors 181 and 182 may be driven in a "crossed" manner, with the voltages on the lines Vdw (MOSFET 181) and Vup (MOSFET 182) respectively.

Consequently, during the ON state, i.e., with the line Vup brought towards +VDD and the line Vdw brought towards −VDD, the control terminal (gate) of the MOSFET transistors 181, 182 can be brought to a level lower (in absolute values) than the voltage level between gate and source of the MOSFET transistor itself, as a result of which said transistor is powered down (i.e., non-conductive), essentially acting as a diode (as indicated by 181' and 182' in FIG. 11).

Complementarily, during the OFF state with the line Vup towards −VDD and the line Vdw brought towards +VDD, the control terminals (gates) of the transistors 181 and 182 are brought to a level such as to power up (i.e., make conductive) the transistors 181 and 182, such that the OFF currents are able to discharge the two lines Vgp and Vgn through the resistors Ron of the two transistors 181, 182, which therefore act as resistors (as indicated with 181" and 182" in FIG. 12).

One or more of the embodiments shown by way of example in FIGS. 10 to 12 make it possible to use an entirely regenerative topology such as the one shown by way of example in FIG. 9, achieving entirely satisfactory performance levels without adding additional circuits on the lines or nodes Vgp and Vgn.

Consequently, the two transistors 161 and 162 can both stay powered up in the transmit phase of the signal from the driver 10 towards the output terminal XDCR (see FIG. 3) with the gate-source voltages recharged by the output signal.

Power-up and power-down may be driven by acting on the lines Vup and Vdw, which may therefore be low-voltage lines without adding additional circuits onto said nodes.

It has also been observed that a solution such as the example shown in FIGS. 10 to 12 does not introduce voltage drops or distortion during the transmit phase or distortions or attenuation during the receive phase.

All of the foregoing helps to achieve virtually negligible consumption.

In one or more embodiments, as shown by way of example in FIG. 13 (and in FIGS. 14 and 15 in terms of operation), it is possible to insert two "real" diodes, indicated respectively using reference signs 191 and 192, between the lines Vup, Vgn and Vgp, Vdw.

Such a circuit can be powered down by inserting two pairs of electronic switches 201, 202 (which may again be MOSFET transistors, respectively N-type and P-type) between the control terminal (gate) and the current path of each of the transistors 161, 162, for example between the nodes designed to be brought to the voltages Vgn and Vgp and the input terminal 16a (to which the sources of the transistors 161 and 162 also lead).

The transistors of each pair 201, 202 can be arranged with the current paths (source-drain) of same in series and with the control terminals (gates) connected to the voltage Vup (for the two P-type MOSFET transistors) and to the voltage Vdw (for the two N-type MOSFET transistors), therefore with the power-up and power-down circuits remaining connected to the nodes Vup and Vdw.

During the ON state (shown by way of example in FIG. 12), the MOSFET transistors 201, 202 are all intrinsically powered down (non-conductive) since the voltage Vup is greater than the voltage on the source-drain nodes of the MOSFET transistors 201, 202, while the voltage Vdw is lower. The transistors 201, 202 therefore act essentially as (two) diodes in cascade, as shown schematically by 201' and 202' in FIG. 14.

In the OFF state, the voltages on the control terminals of the MOSFET transistors 201, 202 "power up" the transistors in question, making same conductive and enabling same to discharge, with the resistance Ron of same, the gate/source capacitance Cgs of the two transistors 161, 162, acting as resistors (as shown schematically and indicated with reference signs 201" and 202" in FIG. 15) enabling the desired operation of the "active diode" block 16 to be achieved.

Solutions such as the examples shown in FIG. 13 (and in FIGS. 14 and 15) again make it possible to use a completely regenerative topology, achieving entirely satisfactory performance levels without adding special circuits on the critical lines/nodes Vgp and Vgn.

Again in this case, the two transistors 161, 162 of the active-diode block 16 can both remain powered up in the transmit phase, with the gate-source voltages Vgs of same recharged by the output signal.

Drive during ON and OFF can be ensured by acting on the voltages Vup and Vdw, which are intrinsically low voltages, without adding special circuits onto said nodes. Again in this case, it has been determined that there are no drop or distortion phenomena during the transmit phase, or any appreciable distortion or attenuation phenomena during the receive phase, and that consumption (in particular continuous) is very low, practically negligible.

One or more embodiments may therefore concern a circuit (for example 16) including:

a first terminal (16a) and a second terminal (16b), a first main transistor (for example 161) and a second main transistor (for example 162) positioned with the current paths thereof in parallel between the first terminal and the second terminal, a first drive line (for example Vup) connectable to opposing first (for example +VDD) and second (for example −VDD) drive voltages, respectively in a first operating state (for example ON) and in a second operating state (for example OFF), as well as a second drive line (for example Vdw) connectable to the opposing first and second drive voltages, respectively in the second operating state and in the first operating state (i.e., with, for example, in the first state, the first line Vup connectable to the first voltage +VDD and the second line Vdw connectable to the second voltage −VDD and, in the second state, the first line Vup connectable to the second voltage −VDD and the second line Vdw connectable to the first voltage +VDD), a first transistor discharge circuit (for example 181, 1610b in FIGS. 10 and 201, 191 in FIG. 13) extending between the first drive line and the current path (for example source-drain) of the first main transistor, the first transistor discharge circuit being coupled (for example in Vgn) to the control terminal (for example gate) of the first main transistor, a second transistor discharge circuit (for example 182, 1620b in FIGS. 10 and 202, 192 in FIG. 13) extending between the current path of the second main transistor and the second drive line, the second transistor discharge circuit (182, 1620b; 202, 192) being coupled (Vgp) to the control terminal of the second main transistor, wherein the transistors of the first transistor discharge circuit and of the second transistor discharge circuit have control terminals coupled to either the first drive line or the second drive line, wherein said transistors of the first transistor discharge circuit and of the second transistor discharge circuit are non-conductive in said first operating state and conductive in said second operating state.

In one or more embodiments (see for example FIGS. 10 to 12):

the first transistor discharge circuit may comprise a first discharge transistor (for example 181) between the first drive line (Vup) and the control terminal (Vgn) of the first main transistor and a first diode (for example 1610*b*) between the control terminal and the current path (16*a*) of the first main transistor (161), while the second transistor discharge circuit may comprise a second discharge transistor (for example 182) between the second drive line (Vdw) and the control terminal (Vgp) of the second main transistor (162) and a second diode (for example 1620*b*) between the control terminal (Vgp) and the current path (16*a*) of the second main transistor (161), and/or the first transistor discharge circuit may comprise a first discharge transistor acting on the first drive line and having the control terminal coupled to the second drive line, while the second transistor discharge circuit may comprise a second discharge transistor acting on the second drive line and having the control terminal coupled to the first drive line, and/or the first transistor discharge circuit may comprise a first discharge field-effect transistor having the current path and the body coupled to the first drive line, while the second transistor discharge circuit may comprise a second discharge field-effect transistor having the current path and the body coupled to the second drive line.

In one or more embodiments, such discharge transistors may act as diodes (see 181', 182' in FIG. 11) when non-conductive and as resistors (see 181", 182" in FIG. 12) when conductive.

In one or more embodiments (see for example FIGS. 13 to 15):

the first transistor discharge circuit may comprise a first pair of discharge transistors (for example 201) positioned with the current paths thereof in series between the control terminal (for example Vgn) and the current path of the first main transistor and a respective first diode (for example 191) between the first drive line and the control terminal of the first main transistor (161), while the second transistor discharge circuit may comprise a second pair of discharge transistors (for example 202) positioned with the current paths thereof in series between the control terminal (for example Vgn) and the current path of the second main transistor and a respective second diode (for example 192) between the second drive line and the control terminal (for example Vgp) of the second main transistor, and/or the first transistor discharge circuit may comprise a first pair of discharge transistors (for example 201) positioned with the current paths thereof in series and acting on the first drive line, the transistors of said first pair being of opposing polarity and having the control terminals coupled to the first drive line (Vup) and to the second drive line (Vdw), respectively, while the second transistor discharge circuit may comprise a second pair of discharge transistors (for example 202) positioned with the current paths thereof in series and acting on the second drive line, the transistors of said second pair being of opposing polarity and having the control terminals coupled to the first drive line and to the second drive line, respectively.

Also in this case, in one or more embodiments, such discharge transistors of such pairs may act as diodes (see 201', 202' in FIG. 14) when non-conductive and as resistors (see 201", 202" in FIG. 14) when conductive.

One or more embodiments may include:

protective diode chains (for example 1610*a*, 1620*a*) between the control terminal and the current path of the first main transistor and of the second main transistor, respectively, and/or coupling diodes (for example 1610*d*, 1620*d*) between said first terminal and the first drive line (for example Vup) and the second drive line (for example Vdw), respectively.

In one or more embodiments, the first main transistor and the second main transistor may be transistors of opposing polarity, optionally N-type and P-type field-effect transistors with common sources, bodies and drains.

One or more embodiments may include an ultrasound apparatus with a transducer terminal (for example XDCR) couplable to an ultrasonic transducer device (for example 12) to convert an electrical drive signal into an ultrasonic transmit signal and convert an ultrasonic receive signal into an electrical receive signal, in which the ultrasound apparatus comprises:

a drive device (for example 10) that can be activated to generate said electrical drive signal during a transmit phase, a receive chain (for example 14) for receiving said electrical receive signal during a receive phase, a switch circuit (for example S1, S2, S3) for coupling said transducer terminal to said drive device and to said receive chain, respectively, during alternating transmit and receive phases, and a circuit according to one or more embodiments that is interposed between said transducer terminal and said switch circuit with said first main transistor and second main transistor switchable between a resistive signal path state (for example R16) between said first terminal (16*a*) and second terminal (16*b*) during said alternating transmit and receive phases and a diode signal path state (for example D16) between said first terminal (16*a*) and second terminal (16*b*) during the transitions between said alternating transmit and receive phases.

A method of using a circuit according to one or more embodiments may involve connecting said first drive line and said second drive line to opposing first and second drive voltages in an alternating sequence of said first and second operating states, with:

said first drive line connected to the first drive voltage and the second drive line connected to the second drive voltage in the first operating state, and said first drive line connected to the second drive voltage and the second drive line connected to the first drive voltage in the second operating state, wherein the transistors of the first transistor discharge circuit and of the second transistor discharge circuit are non-conductive in said first operating state and conductive in said second operating state.

One or more embodiments may include carrying out said alternating sequence of said first and second operating states synchronously with the switching of said first main transistor and second main transistor between a resistive signal path state (R16) and a diode signal path state (D16) between said first (16*a*) and second (16*b*) terminals.

The example drive device shown here may then be activated synchronously, alternating said receive and transmit phases such that the transistors of the first and second transistor discharge circuits are:

non-conductive during said receive and transmit phases, in which the first and second main transistors (for example 161, 162) are in said resistive signal path state (for example R16), and conductive during the transitions between said alternating transmit and receive phases, in which the first and second main transistors (161, 162) are in said diode signal path state (for example D16).

Keeping the basic principles of the invention, the particulars of implementation and the embodiments will be able to vary, even significantly, with respect to what has been illustrated purely by way of non-limiting example, without however straying from the scope of protection.

The various embodiments described above can be combined to provide further embodiments. To the extent not inconsistent with the principles and teachings set forth in the present application, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
a ground terminal;
a first terminal and a second terminal that are each different from the ground terminal;
a resistive signal path;
a diode signal path including a pair of diodes coupled with opposing polarity, the diode signal path being different from the resistive signal path; and
one or more switches coupled to said resistive signal path and said diode signal path, the one or more switches switchable between a first state and a second state and configured, in the first state, to communicatively couple said first terminal and second terminal through said resistive signal path, and configured, in the second state, to communicatively couple said first terminal and second terminal through said diode signal path.

2. The circuit according to claim 1 wherein said diode signal path comprises a pair of anti-parallel diodes.

3. The circuit according to claim 2, further comprising a first transistor and a second transistor, each of the first transistor and the second transistor having a current path with an on resistance, the current paths of the first and second transistors being coupled in parallel with one another between said first terminal and second terminal, and wherein said resistive signal path includes the parallel connection of the on resistances of the current paths of said first and second transistors.

4. The circuit according to claim 3 wherein said one or more switches are configured to control said first transistor and second transistor to be conductive and in said first state and are configured to control said first transistor and second transistor to be non-conductive in said second state.

5. The circuit according to claim 4, further comprising:
a first drive line configured to be coupled to opposite first and second drive voltages in the first state and the second state, respectively;
a second drive line configured to be coupled to the opposite first and second drive voltages in the second state and in the first state, respectively;
a first transistor discharge circuit coupled between the first drive line and the current path of the first transistor, the first transistor discharge circuit being coupled to a control terminal of the first transistor and including a control terminal coupled to the second drive line, the first transistor discharge circuit configured to be non-conductive in the first state and conductive in the second state; and
a second transistor discharge circuit coupled between the second drive line and the current path of the second transistor, the second transistor discharge circuit being coupled to the control terminal of the second transistor and including a control terminal coupled to the first drive line, the second transistor discharge circuit configured to be non-conductive in the first state and conductive in the second state.

6. The circuit according to claim 5, wherein:
the first transistor discharge circuit comprises a first discharge transistor coupled between the first drive line and the control terminal of the first transistor and a first diode coupled between the control terminal and the current path of the first transistor; and
the second transistor discharge circuit comprises a second discharge transistor coupled between the second drive line and the control terminal of the second transistor and a second diode coupled between the control terminal and the current path of the second transistor.

7. The circuit according to claim 5, wherein:
the first transistor discharge circuit comprises a first discharge transistor coupled to the first drive line and having the control terminal coupled to the second drive line; and
the second transistor discharge circuit comprises a second discharge transistor coupled to the second drive line and having the control terminal coupled to the first drive line.

8. The circuit according to claim 5, wherein:
the first transistor discharge circuit comprises a first field effect transistor having a current path and a body coupled to the first drive line; and
the second transistor discharge circuit comprises a second discharge field effect transistor having a current path and a body coupled to the second drive line.

9. The circuit according to claim 4, wherein said first and second transistors comprise first and second field effect transistors, each of the first and second field effect transistors including a source, a drain, a body, and a well diode formed between the body and drain of the field effect transistor, and wherein said diode signal path comprises the well diodes of said first and second field effect transistors.

10. The circuit according to claim 9 wherein said first and second field effect transistors are of an opposing polarity with the bodies coupled together, and further including a resistor between the sources and the bodies of said first and second field effect transistors.

11. The circuit according to claim 9 wherein said first and second field effect transistors are of a same polarity with sources coupled together and drains coupled together, and with a first resistor coupled between the source and the body of said first field effect transistor and a second resistor coupled between the source and body of said second field effect transistor.

12. An ultrasonic apparatus, comprising:
an ultrasonic transducer device that converts an electrical drive signal into an ultrasonic transmit signal and converts an ultrasonic receive signal into an electrical receive signal;
a transducer terminal configured to be coupled to the ultrasonic transducer device;
a drive device configured to generate said electrical drive signal during a transmit phase;
a receive chain configured to receive said electrical receive signal during a receive phase;
a switch circuit configured to couple said transducer terminal to said drive device and to said receive chain, respectively, during alternating transmit and receive phases; and
a circuit coupled between said transducer terminal and said switch circuit, the circuit configured during said alternating transmit and receive phases to provide a resistive signal path between said transducer terminal and said switch circuit, and the circuit configured during the transitions between said alternating transmit and receive phases to provide a diode signal path between said transducer terminal and said switch circuit, the diode signal path being different from the resistive signal path.

13. The ultrasonic apparatus according to claim 12, wherein the diode signal path comprises a pair of diodes coupled in anti-parallel.

14. The ultrasonic apparatus according to claim 12, further comprising a noise-blocking stage including diodes of opposing polarity coupled between said drive device and said circuit.

15. The ultrasonic apparatus according to claim 12 wherein said switch circuit comprises at least one of:
a first switch coupled to said drive device and configured to clamp an output of the drive device to a reference level during said transmit phases;
a second switch configured to couple said transducer terminal to said receive chain during said receive phases and configured to decouple said transducer terminal from said receive chain during said transmit phases; and
a third switch configured to clamp an input of said receive chain to a reference level during said transmit phases.

16. The ultrasonic apparatus of claim 12, wherein the circuit comprises a first transistor and a second transistor coupled in parallel between the transducer terminal and the switch circuit.

17. The ultrasonic apparatus of claim 16, further comprising:
a first drive line configured to be coupled to opposite first and second drive voltages in a first state and a second state, respectively;
a second drive line configured to be coupled to the opposite first and second drive voltages in the second state and in the first state, respectively;
a first transistor discharge circuit coupled between the first drive line and a current path of the first transistor, the first transistor discharge circuit being coupled to a control terminal of the first transistor and including a control terminal coupled to the second drive line, the first transistor discharge circuit configured to be non-conductive in the first state and conductive in the second state; and
a second transistor discharge circuit coupled between the second drive line and a current path of the second transistor, the second transistor discharge circuit being coupled to the control terminal of the second transistor and including a control terminal coupled to the first drive line, the second transistor discharge circuit configured to be non-conductive in the first state and conductive in the second state.

18. The ultrasonic apparatus of claim 17, wherein each of the first and second transistors comprises a well diode and the diode signal path includes the well diodes of the first and second transistors.

19. The ultrasonic apparatus of claim 18, wherein the circuit further comprises a resistive circuit coupled in series with each of the well diodes between the transducer terminal and the switch circuit.

20. The ultrasonic apparatus of claim 12 further comprising:
a processor coupled to the circuit;
a screen coupled to the processor; and
a keyboard coupled to the processor.

21. A method, comprising:
generating a drive signal on a drive node;
coupling the drive node through a resistive signal path to a transducer node coupled to an ultrasonic transducer device;
converting, at the ultrasonic transducer device, the drive signal into an ultrasonic transmit signal when the transducer node is coupled through the resistive signal path to the drive node;
coupling the transducer node to a receive node through the resistive signal path;
converting, at the ultrasonic transducer device, an ultrasonic receive signal into an electrical receive signal when the transducer node is coupled through the resistive signal path to the receive node;
alternately coupling the drive and receive nodes to the transducer node; and
providing, in transition times between the alternate coupling of the drive and receive nodes to the transducer node, a diode signal path between the transmit and the receive nodes, the diode signal path being different from the resistive signal path.

22. The method of claim 21, wherein coupling the drive node to the transducer node through a resistive signal path and coupling the transducer node to a receive node through the resistive signal path comprise coupling the transducer node to each of the drive and receive nodes through parallel resistive paths.

23. The method of claim 21, wherein providing, in transition times between the alternate coupling of the drive and receive nodes to the transducer node, the diode signal path between the transmit and the receive nodes comprises providing a diode signal path including anti-parallel diodes.

24. The method of claim 21 further comprising converting the electrical receive signal on the receive node into a visual image.

25. The method of claim 24, wherein converting the electrical receive signal on the receive node into the visual image comprises converting the electrical receive signal into an image of a portion of a body of a person or converting the electrical receive signal into an image of a piece of material being inspected or analyzed.

26. The method of claim 21, wherein coupling the drive node through a resistive signal path to the transducer node and coupling the transducer node to the receive node through the resistive signal path comprises controlling first and second transistors coupled in parallel between the drive node and a transceiver node, each of the first and second transistor having a control node and a current path with an on resistance, and wherein the method further comprises limiting voltages between the current path and the control node of each of first and second main transistors to ensure the first and second transistors are both conductive in a first state of operation and both non-conductive in a second state of operation.

* * * * *